United States Patent [19]

Menell et al.

[11] Patent Number: 4,711,691
[45] Date of Patent: Dec. 8, 1987

[54] TIRE BUILD-UP MACHINE

[75] Inventors: Hans Menell, Hanover; Hubert Ringhoff, Seelze; Jürgen Rump, Garbsen, all of Fed. Rep. of Germany

[73] Assignee: Continental Gummi-Werke Aktiengesellschaft, Hanover, Fed. Rep. of Germany

[21] Appl. No.: 798,173

[22] Filed: Nov. 14, 1985

[30] Foreign Application Priority Data

Nov. 20, 1984 [DE] Fed. Rep. of Germany ....... 3442302

[51] Int. Cl.$^4$ .......................................... B29D 30/24
[52] U.S. Cl. .................................... 156/415; 156/420
[58] Field of Search ............... 156/414, 415, 416, 417, 156/420, 133

[56] References Cited

U.S. PATENT DOCUMENTS

| 2,335,169 | 11/1943 | Bostwick | 156/415 |
| 3,644,162 | 2/1972 | Appleby et al. | 156/415 |
| 3,695,974 | 10/1972 | Henley | 156/415 |
| 3,767,509 | 10/1973 | Gazuit | 156/420 X |
| 4,010,058 | 3/1977 | Kubinski et al. | 156/420 X |

FOREIGN PATENT DOCUMENTS 2441485 3/1975 Fed. Rep. of Germany ...... 156/415

Primary Examiner—Donald E. Czaja
Assistant Examiner—Ramon R. Hoch
Attorney, Agent, or Firm—Becker & Becker, Inc.

[57] ABSTRACT

The build-up drum of build-up machines is frequently interchangeably mounted on its drive shaft in order to be able to adapt to changes in dimension in the production program with one and the same machine. If the operating and control elements associated with the drum bear directly against the end walls of the drum, each change of the drum requires considerable expense for adjustments and alignments. This is avoided by providing the build-up drum on both sides with a respective spacer and abutment sleeve against which the movable operating and control elements can bear in a constantly uniform orientation relative to the middle of the drum as the critical reference plane.

4 Claims, 2 Drawing Figures

TIRE BUILD-UP MACHINE

BACKGROUND OF THE INVENTION

1. Field of the Invention

The present invention relates to a tire build-up machine having a build-up drum that is removably mounted on a drive shaft, with operating and control elements bearing against the end walls of the build-up drum.

2. Description of the Prior Art

The various operating and control elements, such as core installers, limit switches, control cams, pneumatic switching devices, etc., are associated with the actual winding or build-up drum of known build-up machines as auxiliary devices. These operating and control elements always have to be aligned, in a symmetrical pairing, relative to the middle of the drum as an imaginary reference plane. This alignment is necessary in ordeer to assure a satisfactory result during the extensively automatic progress of the successive build-up steps. This is generally achieved with the necessary precision without any particular difficulty by having the axially movable operating and control elements directly contact the fixed end walls of the build-up drum, the diameter of which can be altered. However, such a construction results in difficulty due to the frequency occurring potential for alternately using build-up drums of various dimensions in one and the same machine, and where necessary modifying these drums as required for the manufacture of different tire types. Since for fit and assembly reasons all drums are provided with a hub dimensioned pursuant to universally binding standards, each time a drum is changed differences in the spacing of the outer drum segments results, which necessitates a renewed orientation of the operating and control elements to the altered reference parameter.

An object of the present invention is to drastically reduce the great amount of work associated with the adjustment of the individual abutment members, and consequently to simplify and accelerate the removal and exchange of drums.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

The tire build-up machine of the present invention is characterized primarily in that a respective spacer and abutment sleeve is disposed on each side of the build-up drum and is interposed between each end wall thereof and the operating and control elements for receiving the bearing pressures of the latter.

The spacer and abutment sleeves are expediently rigidly connected with the build-up drum and are concentric relative to the drive shaft. In a further practical embodiment of the present invention, sleeves of different axial length are provided, and can be interchanged along with the build-up drum.

The present invention, with surprisingly simple means, provides the conditions for a problem-free interchange of the build-up drums. By placing expediently dimensioned additional sleeves on both sides of the drums, that distance between the drum hub and the external end edges of the drum segments that is critical for the correct adjustment of the machine can also be kept at the correct predetermined value without having to do anything further. Since the movable operating and control means bear against these sleeves, they have consequently in all cases achieved their indexing position in a uniformly precise orientation relative to the middle of the drum as the reference plane, so that there is no longer any necessity for individual orientation. Every change of type and dimension in the production program can therefore be undertaken rapidly and easily merely by exchanging the build-up drum, along with its associated spacer sleeves, without having to undertake any other adjustments. The thus considerably reduced conversion times make is possible to achieve a significantly greater work output at no additional expense.

DESCRIPTION OF PREFERRED EMBODIMENTS

Figure 1:
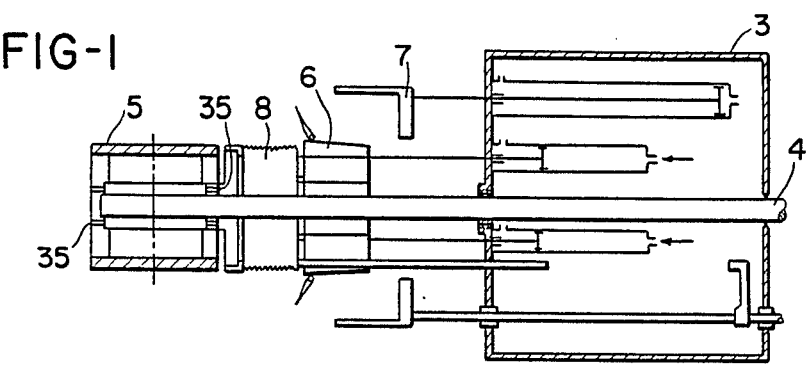
FIG. 1 is a view, limited to the drive side, of the arrangement of one embodiment of the inventive tire build-up machine.
Figure 2:
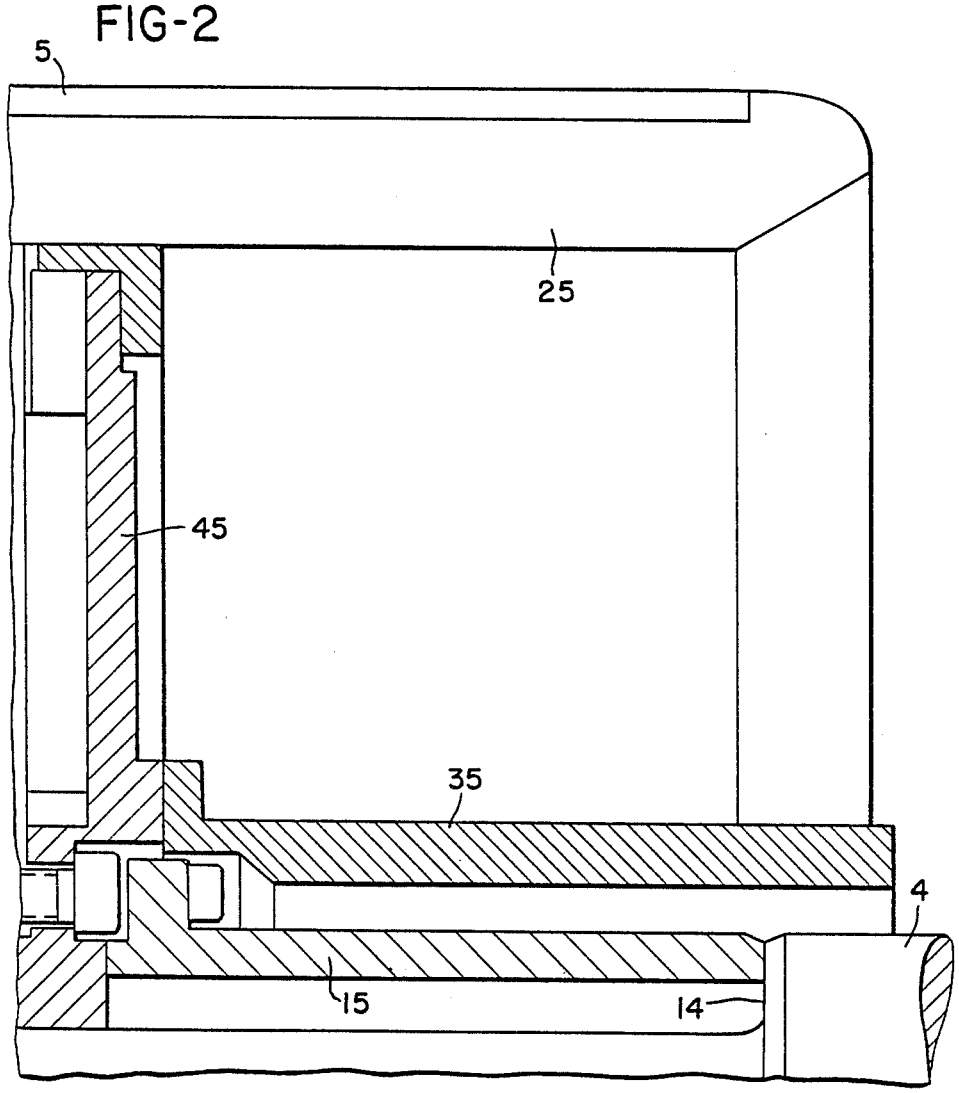
FIG. 2 is an enlarged cross-sectional illustration of one detail of FIG. 1.

Referring now to the drawing in detail, the build-up machine illustrated in FIG. 1 is provided with a stationary gearbox and drive mechanism 3, which includes a main drive motor that can be controlled and reversed. The motor acts upon the drive shaft 4 that is mounted in the gearbox and drive mechanism 3, and emerges from one end thereof. The drive shaft 4, in turn, is provided for the build-up drum 5 that is rigidly mounted thereon. The gearbox and drive mechanism 3 further includes various operating and control elements that are required for the build-up process. These elements include, for example, core-loading mechanism 6, core-setting rings having turnover rings 7, bellows support 8, etc., the paired cooperating members of which, along with associated actuating devices, are provided in a non-illustrated displacement body that is basically similar to the gearbox and drive mechanism 3, and is provided on the other side of the build-up drum 5. The diameter of the build-up drum 5 can be altered in a known manner, and the drum is rigidly connected to the drive shaft 4, whereby the hub 15 of the drum rests against a shoulder 14 of the drive shaft 4 in a positive manner, as shown in the partial view of one end section of the drum in FIG. 2. If necessary, the build-up drum 5 can be replaced by a different drum having different dimensions of the radially adjustable outer segments 25.

With the heretofore known build-up machines, a change of the width of the drum was in each case accompanied by a change in the axial orientation of the reference plane for the operating and control elements. With the present invention, this alteration of the axial orientation of the reference plane is basically eliminated by the provision of spacer sleeves 35 at the end walls 45 of the build-up drum 5. The spacer sleeves 35, that are mounted to the end walls via non-illustrated means, extend around the drive shaft 4 without touching it, and are concentric thereto. These spacer sleeves form an extension of the drum that leads into the vicinity of the edge plane of the segments 25, and that is independent of the drum hub 15, which is positively held in position upon the shoulder 14 of the drive shaft 4. The operating and control elements can bear directly against this extension of the drum, i.e. the spacer sleeves 35, in an orientation that is always the same relative to the middle of the drum.

The present invention is, of course, in no way restricted to the specific disclosure of the specification and drawing, but also encompasses any modifications within the scope of the appended claims.

What we claim is:

1. A tire build-up machine having a core-loading machine and a build-up drum that is interchangeable quickly for build-up drums of different width to produce tires of different width and that is removably mounted on a drive shaft with the drum having a central rotational axis, with operating and control elements bearing against the end walls of said build-up drum which has a middle plane perpendicular to the rotational axis of the drum as an axial reference plane; the improvement in combination therewith comprising:

means including a respective spacer and abutment sleeve along with the core-loading mechanism as an auxiliary device positioned always with reproducible accuracy as corresponding to width of the respectively installed build-up drum associated therewith and as interposed between each of said end walls of said drum on the central rotational axis, and said operating and control elements being axially movable, for receiving the bearing pressures of the latter and being engageable as to the core-loading mechanism directly in a constantly uniform orientation that is always the same relative to the middle plane of the build-up drum as said axial reference plane and for exact positioning thereof during interchange as to different drum widths to convert production from narrow tire size to wide tire size without any great mounting and adjustment expenditure being necessary consequently to simplify and accelerate removal and exchange of build-up drums.

2. A tire build-up machine in combination according to claim 1, in which each of said spacer and abutment sleeves is rigidly connected to said build-up drum, and is concentric relative to said drive shaft.

3. A tire build-up machine in combination according to claim 2, which includes spacer and abutment sleeves that have different axial lengths and are interchangeable along with said build-up drum.

4. A tire build-up machine in combination according to claim 3, in which the length of a given spacer and abutment sleeve is such that its end remote from said build-up drum always essentially coincides with the outer edge-delimiting plane of peripheral elements of the associated build-up drum.

* * * * *